Figure 8:
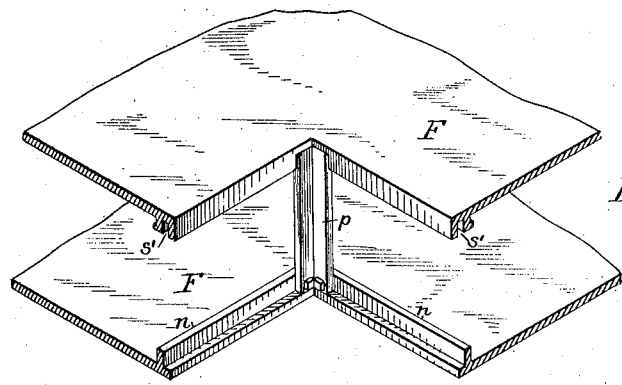
Figure 9:
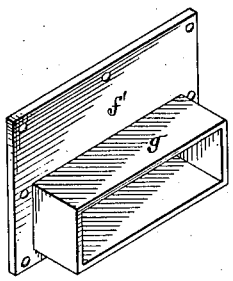

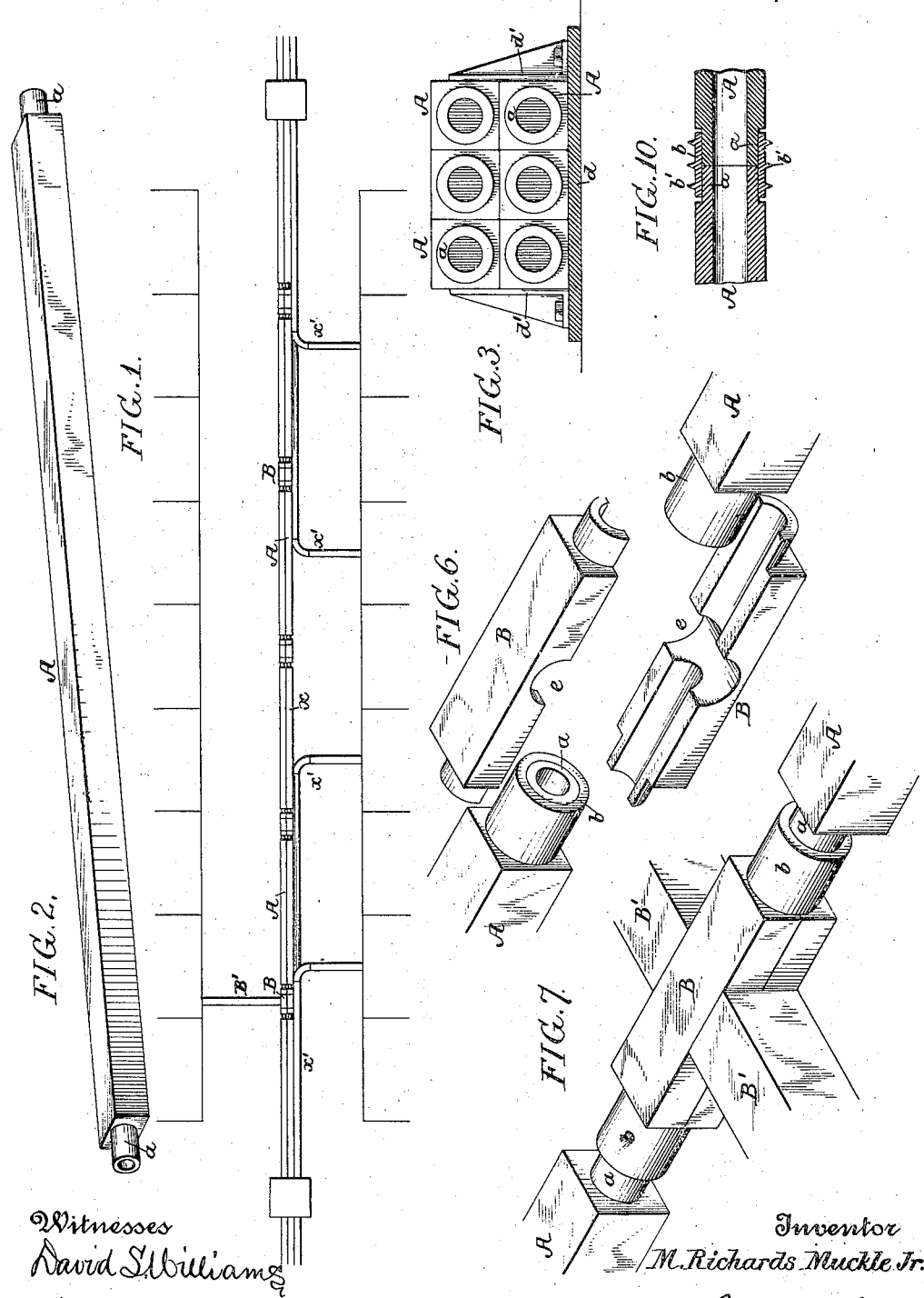

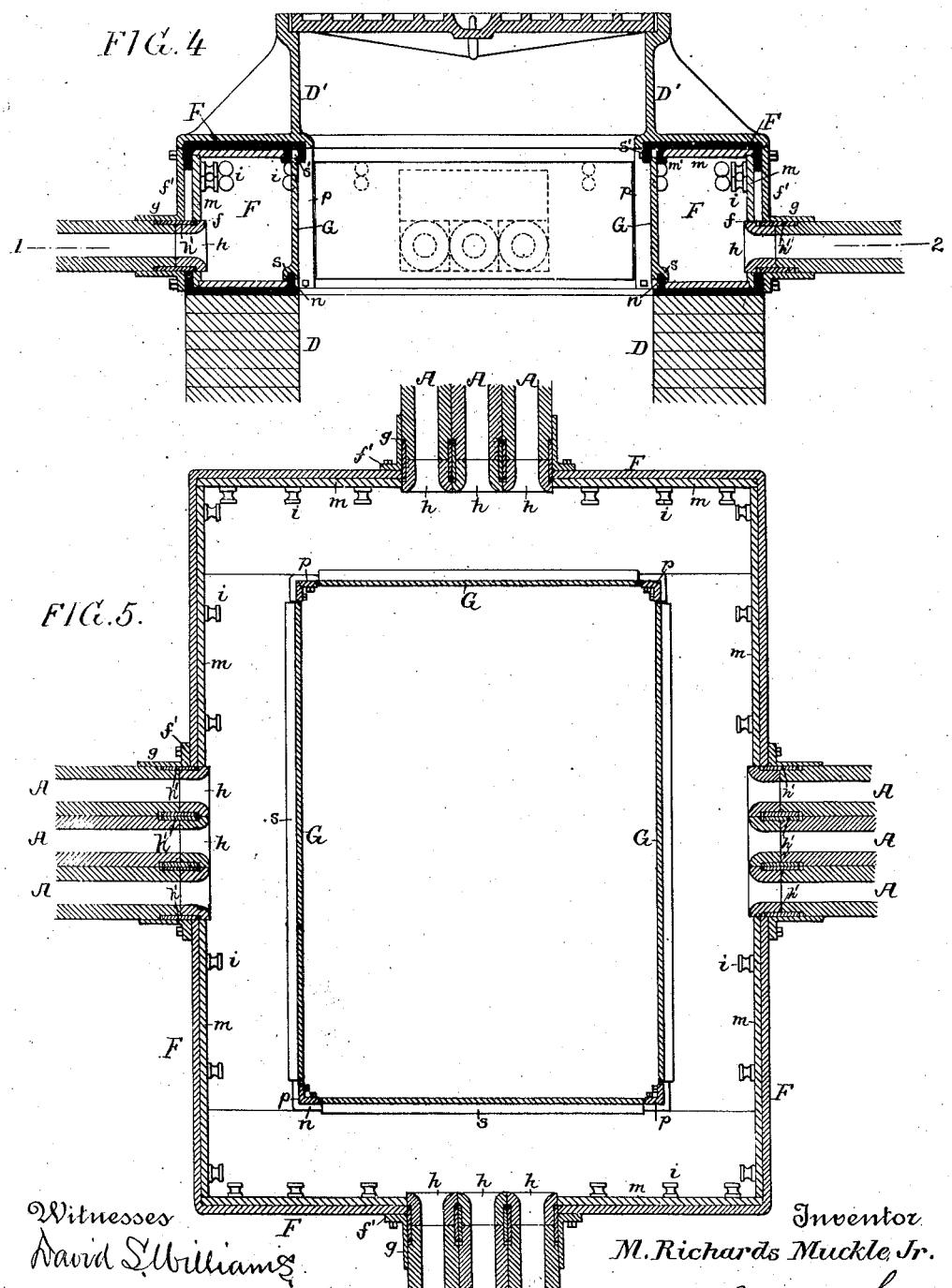

(No Model.) 3 Sheets—Sheet 3.

M. R. MUCKLE, Jr.

UNDERGROUND CONDUIT FOR ELECTRICAL CONDUCTORS.

No. 378,801. Patented Feb. 28, 1888.

Witnesses
David S. Williams
Hamilton D. Turner.

Inventor
M. Richards Muckle, Jr
By his Attorneys Howson & Howson

UNITED STATES PATENT OFFICE.

M. RICHARDS MUCKLE, JR., OF PHILADELPHIA, PENNSYLVANIA.

UNDERGROUND CONDUIT FOR ELECTRICAL CONDUCTORS.

SPECIFICATION forming part of Letters Patent No. 378,801, dated February 28, 1888.

Application filed August 26, 1887. Serial No. 247,929. (No model.)

*To all whom it may concern:*

Be it known that I, M. RICHARDS MUCKLE, Jr., a citizen of the United States, and a resident of Philadelphia, Pennsylvania, have invented an Improved Underground Conduit for Electrical Conductors, of which the following is a specification.

The main objects of my invention are to provide a cheap underground conduit for electrical conductors, to facilitate the laying of the same, to provide a ready means for making branch connections, and to protect the conductors where they are carried across the manhole.

In the accompanying drawings, Figure 1 is a diagram illustrating an underground conduit made in accordance with my invention. Fig. 2 is a perspective view of one of the sections of the conduit. Fig. 3 is a transverse section showing how the conduit is built up. Fig. 4 is a transverse section of a part of the man-hole chamber. Fig. 5 is a sectional view of the same on the line 1 2; and Figs. 6 to 11, inclusive, are detached views illustrating features of construction.

Each of the sections of the conduit consists of a wooden tube, A, of square or other polygonal cross-section, and having a smooth and uniform bore from end to end, the opposite ends of this tube being turned off, so as to form cylindrical projections $a$, which, in laying the conduit, are united by means of a sleeve, $b$, slipped over the projections of adjoining lengths of the conduit, as shown in Fig. 10, this sleeve, in the case of a single conduit, being preferably stiffened and strengthened by external ribs, $b'$, which have sharp edges, so that they will cut into the earth and will not prevent the proper seating of the conduit in the trench dug for its reception.

Where a multiple conduit is to be produced by building up a series of sections, as shown, for instance, in Fig. 3, plain tubes should be used, in order that the sections may be packed snugly together, as shown in said figure, the structure resting upon a suitable base-plate, $d$, deposited in the bottom of the trench, and being confined laterally by brackets $d'$, secured to said base-plate.

When laying my improved conduit in the streets of towns or cities, I avoid the necessity of tearing up the streets, in order to make branch connections, by making a number of branch connections when the conduit is first being laid. For instance, in the diagram shown in Fig. 1 the central tube extends continuously from man-hole to man-hole and carries a trunk-line wire or wires, $x$, but in laying the conduit I provide a number of branch pipes, $x'$, each of which leads from the man-hole to one of a number of buildings between successive man-holes. Thus in the illustration shown there is a direct communication between each man-hole and two of the houses in the block between the man-holes.

As each of the branch pipes has a smooth, uniform, and continuous bore, a conductor can be readily pushed from the man-hole into the house with which the branch pipe communicates, so that provision is afforded for running branches and making connections entirely within the man-hole without disturbing the street after the conduit is once laid, the sub-branches being carried through the houses of the block until the desired point is reached. This plan necessitates a waste of conductor as compared with a direct connection from the conduit to the house; hence, where the conduit is readily accessible, I propose to insert between the long lengths of pipe constituting the conduit short two-part lengths B, the parts being held together by tubes or sleeves $b$, whereby the reduced ends $a$ are connected to the reduced ends of the adjoining long sections of pipe. These reduced ends, however, are of such length that the sleeves $b$ can be slipped back on the same, so as to release the ends of the short pipe-section B, and thus permit the separation of the two parts of said section when it is desired to gain access to the conductor for the purpose of connecting a branch wire thereto.

Each half of the short pipe-section B has in one side a segmental recess, $e$, and when the halves of the pipe are fitted together this forms an opening to which can be adapted the reduced end of a branch pipe, B′, containing the branch conductor, the opening being closed under ordinary circumstances by a suitable plug. It will thus be seen that when it is desired to make a branch connection it is only necessary to gain access to one of the short two-part sections of the tube and to separate the same in order to expose the conductor, a lateral trench being dug to receive the branch pipe B' after the connection has been made.

Figure 11:
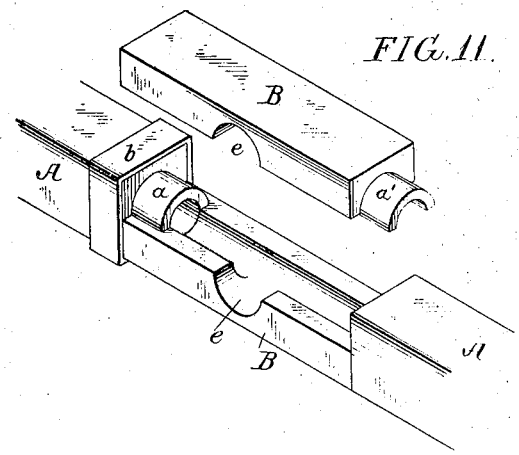

In the modification shown in Fig. 11 the halved short-length pipe B is formed with a recess at one end for the reception of the projection $a$ on the end of the adjacent long tube A, while at the other end is a projection, $a'$, to fit a recess in the end of the other long tube. The halves of the short tube are held in place by the retaining-band $b$. To open the joint for the purpose of making a connection, the retaining-band $b$ is driven back, as shown in Fig. 11, and the upper half of the short-length pipe is tilted up at that end and then drawn out endwise, so as to free the projection at its other end from the recess in the long pipe A.

It is desirable to protect the conductors where they are carried across the man-holes from one section of conduit to another; hence I interpose between the masonry-lining D of the man-hole chamber and the upper structure, D', which supports the cover-plate, a box, F, which forms in effect a distributing-chamber extending completely around the man-hole chamber, the ends of the conduits terminating in this distributing-chamber, and the conductors being carried around through the same from one conduit to another without crossing or being within the limits of the upper portion of the man-hole chamber. The outer portion of the box has openings $f$, which receive the ends of the pipes constituting the conduit, and I prefer to form these openings of a size to receive the maximum number of pipes of which the conduit is to be composed, and if a portion only of the pipes are laid in the first instance I close the enlarged openings in the box by means of a plate, $f'$, having sockets $g$, so shaped as to receive the number of pipes of which the conduit is composed.

Each pipe A terminates in the box F in a bell-mouthed section, $h$, secured to the reduced end of the pipe by a sleeve, $h'$, preferably of the same external shape as the pipe itself, so that the plain rectangular socket $g$ will receive the ends of the pipes and fit snugly to the coupling-sleeves. The bell-mouthed section of the pipe permits the drawing of the conductor laterally therefrom without sharply bending the conductor or unduly wearing the end of the pipe.

The conductor, in being carried around the distributing-chamber, is supported between knobs or buttons $i$, secured to wooden slabs $m$, forming a lining for the box F, the top slab engaging at the front edge with a shoulder, $m'$, on the box, and being supported at the rear edge by the rear slab. The bottom slab is interposed between said rear slab and the bottom flange, $n$, at the front of the box, so that by first applying the top slab, then the rear slab, and then the bottom slab all three may be securely retained without the use of nails or other fastenings.

The inner side of the box F is open in order to permit access to the conductors passing through the same. In order to prevent the breaking down of the upper side of the box when heavy weights pass over the man-hole cover, I support said top plate at each of the inner corners of the box by means of posts $p$, extending from top to bottom of the box, as shown in Fig. 4, these posts being preferably secured so as to be readily detachable when it is desired to carry into the distributing-chamber a loop of wire extending from conduit to conduit.

Detachable cover-plates G are provided for the inner side of the box F, each of these cover-plates having at its lower edge a grooved flange, $s'$, adapted to the flange $n$ on the under side of the box and being fitted at the top into a groove $s'$, extending around the top of the box, near the inner edge of the same, this groove being of such depth that the plate may be lifted up into the same to such an extent as to clear its lower edge from the flange $n$, the plate being then withdrawn laterally and dropped down out of position.

The conductors are thus entirely protected and the chamber in which they are contained is kept dry, even though water has free access to the man-hole chamber itself.

I claim as my invention—

1. The combination, in an underground conduit, of a trunk-line conduit extending from man-hole to man-hole, with branch conduits extending part way between the man-holes parallel with the trunk-line conduit, but independent thereof, and having rounded connections with lateral branches leading to the points of distribution between the man-holes, all substantially as specified.

2. The combination of the long sections of the conduit, interposed short sections made in halves, and the slip-sleeves whereby said half-sections are secured together and to the long sections of the conduit, all substantially as specified.

3. The combination of the pipe-sections, reduced at the ends, with a coupling-sleeve having external sharp-edged ribs, substantially as specified.

4. The combination of a conduit consisting of a number of polygonally-shaped tubes, with a supporting-plate therefor, and lateral confining-brackets secured to said plate, substantially as specified.

5. The combination of a series of underground conduits, a man-hole chamber having below the top a distributing-chamber extending around said man-hole chamber from conduit to conduit, and detachable plates forming the inner sides of said distributing-chamber, all substantially as specified.

6. The combination of the masonry-lining of the man-hole chamber, the top structure supporting the cover-plate, and a box interposed between the top structure and the masonry-lining and communicating with the conduits, substantially as specified.

7. The combination of the top structure of the man-hole chamber, the box beneath the same, and removable supporting posts or braces at the inner edges of said box, substantially as specified.

8. The combination of the man-hole with the distributing-box extending around the man-hole chamber and having at the inner side detachable cover-plates adapted to grooves in the box at their upper edges and engaging with tongues on the box at their lower edges, all substantially as specified.

9. The combination of the man-hole chamber having a distributing-chamber below the top, with a lining for said distributing-chamber, consisting of top, back, and bottom slabs wedged into the chamber, all substantially as specified.

In testimony whereof I have signed my name to this specification in the presence of two subscribing witnesses.

M. RICHARDS MUCKLE, Jr.

Witnesses:
 JOHN T. LEWIS,
 HENRY HOWSON.